United States Patent [19]
Lee et al.

[11] Patent Number: 6,117,810
[45] Date of Patent: Sep. 12, 2000

[54] MANUFACTURING METHOD OF COMPLEX MOLECULAR SIEVE COMPOUND

[75] Inventors: Jung Min Lee; Jeong Kwon Suh; Soon Yong Jeong, all of Daejeon; Chun Hee Park, Seoul; Jeong Hwan Park, Daejeon, all of Rep. of Korea

[73] Assignee: Korea Research Institute of Chemical Technology, Rep. of Korea

[21] Appl. No.: 09/202,183
[22] PCT Filed: Jun. 9, 1997
[86] PCT No.: PCT/KR97/00107
§ 371 Date: May 4, 1999
§ 102(e) Date: May 4, 1999
[87] PCT Pub. No.: WO97/47381
PCT Pub. Date: Dec. 18, 1997

[30] Foreign Application Priority Data

Jun. 11, 1996 [KR] Rep. of Korea ...................... 96-20758

[51] Int. Cl.$^7$ .............................. B01J 29/04; B01J 29/87; B01J 21/18; B01J 20/02; C01B 33/20
[52] U.S. Cl. ........................... 502/60; 502/180; 502/182; 502/405; 502/407; 502/413; 502/417; 502/423; 502/427; 428/613; 428/367; 428/408; 423/326; 423/325; 423/327.1; 423/328.1

[58] Field of Search ............................ 106/475; 264/238; 423/326, 327.1, 328.1; 428/613, 367, 408; 502/64, 62, 180, 182, 405, 407, 413, 417, 423, 427

[56] References Cited

U.S. PATENT DOCUMENTS 4,263,268  4/1981  Knox et al. .............................. 423/449
5,208,099  5/1993  Maiwald-Hiller et. al. ......... 428/306.6

*Primary Examiner*—Steven P. Griffin
*Assistant Examiner*—Jonas N. Strickland
*Attorney, Agent, or Firm*—Finnegan, Henderson, Farabow, Garrett & Dunner LLP

[57] ABSTRACT

The present invention relates to a manufacturing method of molecular sieve compound and in particular, to a manufacturing method whereas crystalline aluminosilicate salt is formed in the pores of activated carbon and thereby possessing both hydrophilic and hydrophobic adsorption capacity, therefore the molecular sieve compound manufactured according to this present invention is in use for treatment agent of wastewater, deodorizing agent, antibacterial and disinfectant agent, adsorbent of organic matter and water, removal agent of harmful gas of cigarette, separable agent of air and many other applications.

6 Claims, 1 Drawing Sheet

MANUFACTURING METHOD OF COMPLEX MOLECULAR SIEVE COMPOUND

BACKGROUND OF THE INVENTION

1. Field of the invention

The present invention relates to a manufacturing method of molecular sieve compound and in particular, to a manufacturing method whereas crystalline aluminosilicate salt is formed in the pores of activated carbon and thereby possessing both hydrophilic and hydrophobic adsorption capacity, therefore the molecular sieve compound manufactured according to this present invention is in use as treatment agent of wastewater, deodorizing agent, antibacterial and disinfectant agent, adsorbent of organic matter and water, removal agent of harmful gas of cigarette, separable agent of air and many other application.

2. Description of the Prior Art

Crystalline aluminosilicate salt(also called 'zeolite') have the following formula (I)

$$M_{2/n} \cdot Al_2O_3 \cdot xSiO_2 \cdot yH_2O \quad (I)$$

wherein,

M is cation, n is cation valence, x, y are the constants depending upon the structure of zeolite.

Generally, zeolite has pore diameter of range 3~10 Å and thus act as molecular sieving effect. Especially as a hydrophilic adsorbent, zeolite has a strong adsorption power for polar molecules like water and this adsorption power is very large even under low partial pressure and high temperature. As adsorption capacity mentioned above, zeolite is widely applied in adsorbent, catalyst, catalyst carrier, molecular sieve, detergent addition agent and many other fields.

Up to the present, many scientists are engaged in research to synthesize zeolites. The synthesis processes generally require organic materials, alcohols and acids in the crystallization of aluminosilicate salt by hydrothermal reaction. This method results in various contamination by adding above materials and has shortcoming such as the control of mole ratio of silica to alumina. Furthermore reaction involves conversion of gel phase into slurry phase which results in formation of material with to several to several scores $\mu$m of average diameter requiring filtration step to isolate proper size of particles followed by washing and spray drying to get final product. And in order to use for adsorption or catalyst process, an intricate sequence of process to granulate has to be followed.

Activated carbon is manufactured by carbonization of coconut husk, coal, wood and polymer fiber followed by activation under reduction condition. The activated carbon thus produced could be granular, fragment, powder or fibrous type with pore diameter of several to several hundreds Å. Activated carbon is hydrophobic adsorbent with strong adsorption power for non-polar molecules and its specific surface area can be attained till more than 1200 $m^2/g$. Due to these novel properties, activated carbon is widely used as adsorbent for purification, food industry, deodorizing agent, decoloring agent, treatment agent of waste water, air clean agent and also catalyst carrier.

And recently, many researches to combine adsorption capacity of activated carbon and zeolite are being conducted. For instance, Japanese non-examination patent sho 54-53669 discloses a manufacturing method of adsorbent having multi-functions by adding organic and inorganic binder to mixture of zeolite and activated carbon.

Korean patent application No. 94-18327 by this applicant is reported a manufacturing method of molecular sieve which zeolite is added to activated carbon and the material to be carbonized in plasticity.

But as previously mentioned, conventional methods are difficult in controlling by powder mixing and have to granulate using appropriate binder.

To overcome said problem in prior art, the inventors report development of a new manufacturing method wherein zeolite is directly crystallized in the pores of activated carbon.

SUMMARY OF THE INVENTION

The objective of this invention is to provide a manufacturing method for molecular sieve compound having large adsorption power for both hydrophilic and hydrophobic adsorption capacity.

In accordance with this invention, silica tetrahedron or alumina tetrahedron produced in alkaline aqueous solution is allowed to deposit into the pores of activated carbon by various mole ratio, silica and alumina components contact with alkali reactive mother liquor and promote seeding of the crystals in activated carobon pores. So complex molecular sieve compound with fine zeolite crystalline in the pores of activated carbon is produced as follows.

DESCRIPTION OF THE DRAWINGS

The invention will be described in greater details in the drawings.

DETAILED DESCRIPTION OF THE INVENTION

Figure 1:
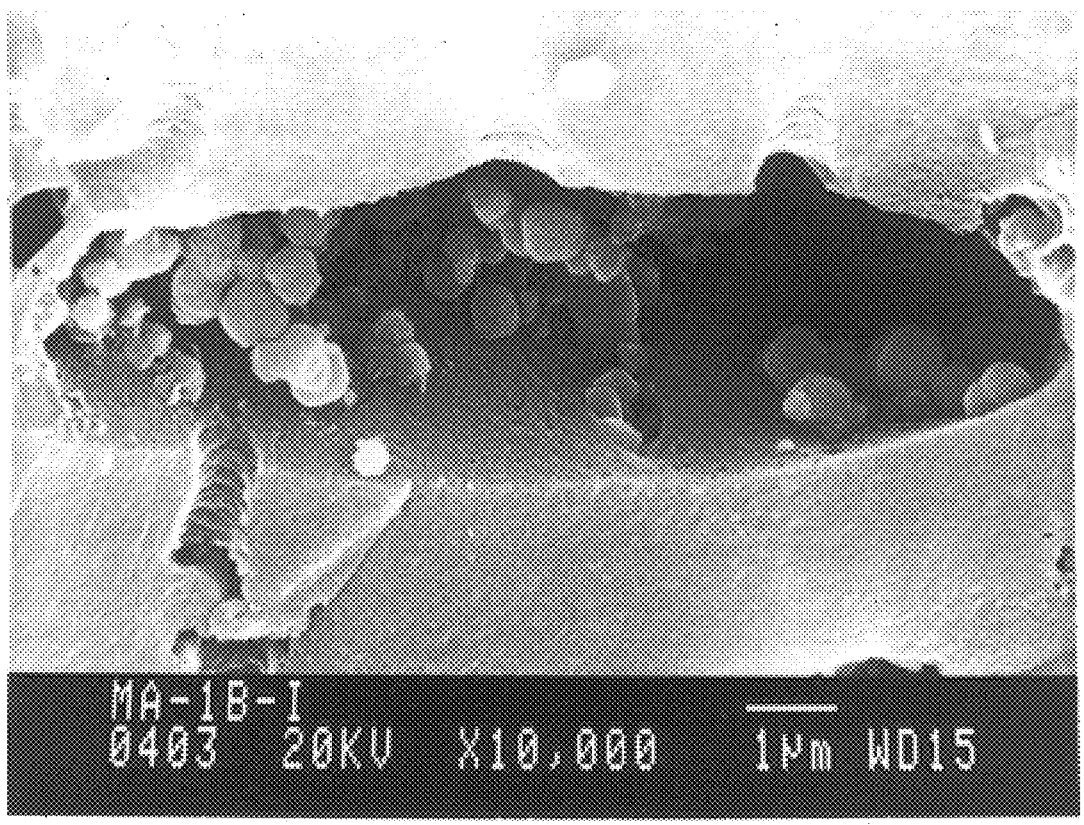
FIG. 1 is a Scanning Electron Micrograph showing distribution of zeolite in the pores of activated carbon produced according to Example 1.

This invention relates to a manufacturing method of molecular sieve compound having multi-functional adsorption capacity, which is characterized in comprising:

(a) Manufacturing sodium aluminate aqueous solution by reacting sodium hydroxide and the substance of alumina;

(b) Manufacturing sodium silicate composition by reacting sodium hydroxide and the substance of silica;

(c) Gelation by homogeneous mixing said sodium aluminate aqueous solution and sodium silicate composition;

(d) Deposition of gel composition into the pores of activated carbon; and (e) Aging and crystallization.

More detailed description of this invention is as follows.

This invention relates to manufacturing method of multi-functional molecular sieve compound which is the 3-dimensional zeolite having homogeneous pore and channel. Said zeolite is produced by crosslinking oxygen with silica tetrahedron and alumina tetrahedron in alkali aqueous solution in the pores of activated carbon.

The activated carbon is used as supporter because of high adsorption capacity due to the presence of various size of pores. So if gel phase composition is settled at time of zeolite synthesis, silica tetrahedron or alumina tetrahedron deposits into the pores of activated carbon and mole ratio of silica ($SiO_4$) vs alumina($Al_2O_3$) can be freely controlled in this processing.

Furthermore, silica and alumina components thus reaching activated carbon in contact with mother liquor and promote seeding action, thereby fine zeolite crystalline can be firmly produced in the pores of activate carbon.

In synthesis of crystalline aluminosilicate according to the present invention, sodium hydroxide is used for the substance of alkaline. Sodium aluminate(NaAlO$_2$), aluminum nitrate(Al(NO$_3$)$_3$.9H$_2$O), aluminum sulfate(Al$_2$(SO$_4$)$_3$.18H$_2$O), aluminum chloride(AlCl$_3$.6H$_2$O), aluminum hydroxide (Al(OH)$_3$), aluminum alkoxide and alumina gel etc. can be used as the substance of alumina. Colloidal silica, fumed silica, water glass(sodium silicate aqueous solution), silica gel etc. can be used as the substance of silica.

The factors affecting crystallization of aluminosilicate are the substance of silica, mole ratio of silica vs alumina, pH, reaction temperature, reaction time, degree of aging in room temperature, presence of stirring etc. The morphology and nature of zeolite produced are directly linked to these variation.

Among the these factor, taking example of the substance of silica; if size of silica particles becomes larger, the reactivity of the complex reduces while stable state is reached. The particle size of silica is affected by kinetics of hydroylsis or condensation under the alkali condition. So it is very important factor in crystalline reaction.

Generally if particle size of silica is greater than 100 μm, crystalline reaction is very slow and amorphous gel is formed. On the other hand, if particle size of silica is very small, it is converted into other phases(quartz, cristobalite, keatite) which is very sensitive to surrounding environment.

The factor to affect crystalline reaction of zeolite is mole ratio of silica/alumina, which is important factor to decide morphology of zeolite, such as zeolite of A, X, Y type, in case zeolite of P type or anlacime.

The other factor is pH. Because silica particle is very stable particle, the formation of nucleation of zeolite must be performed under strong base condition. As silica particles having low reactivity are readily dissolved under the alkali condition, they have high reactivity and easily formed nucleus.

Finally, reaction temperature and reaction time are interdependent. As reaction time becomes longer, unstable crystals among already produced crystals are ressolved in strong alkali solution and the phase transition occurs.

A manufacturing method of molecular sieve compound according to the present invention is as follows.

A suitable sodium aluminate solution is made by adding the substance of alumina to sodium hydroxide solution and stirring for 20~60 minutes at 70~120° C. to dissolve completely. Concentration of sodium hydroxide in solution is 20~50 wt %, especially 30~40 wt %. Sodium silicate composition is produced by sufficiently stirring at 25~70° C. the sodium hydroxide solution and the substance of silica.

Furthermore, sodium aluminate solution and sodium silicate composition are mixed in ratios up to SiO$_2$/Al$_2$O$_3$= 2.0~40.0 mole ratio, Na$_2$O/SiO$_2$=0.4~2.0 mole ratio, H$_2$O/Na$_2$O=15.0~70.0 mole ratio and gelation is brought about homogeneously mixed using stirring machine.

Following gelation, gel composition is allowed to deposit into the pores of activated carbon by adding activated carbon of 20~70 wt % and reducing pressure. In the above process, if mole ratio of SiO$_2$/Al$_2$O$_3$ is under 2.0, alumina component remains in final product and if mole ratio is greater than 40, crystallization of zeolite from reactant becomes difficult.

Beside, if mole ratio of Na$_2$O/SiO$_2$ is under 0.4, activity of silica component is difficult, it is slowly converted into zeolite. If mole ratio is more than 2.0, crystalline aluminosilicate having very low activity like hydroxy sodalite or analcime is produced.

If mole ratio of H$_2$O/Na$_2$O is under 15, alkalinity in solution is so high that side reactions easily occur. If more than 70.0, then high pressure and temperature are required for the synthesis reaction.

On the other hand if activated carbon is added under 20 wt % in reaction, the component to be converted into zeolite is so excessive that the zeolite particles condensed at the outside of the pores of activated carbon exist and side products of slurry phase are produced in excess. If activated carbon in reaction is more than 70 wt %, then gel component fails to homogeneously deposit into the pores of activated carbon and a heterogeneous product is produced.

The reaction mixture is allowed to age for 2~96 hours at 25~60° C. and crystallized at 70~120° C., especially it is appropriate to crystallize at 90~100° C. for 2~24 hours.

Upon completion of crstallization, the side product of slurry phase is separated and final product washed with water, and dried for 4~12 hours at 100~120° C. in dryer to provide molecular sieve compound.

To evaluate structure and physical property of molecular sieve compound manufactured in this method, X-ray diffraction (XRD), the pore structure by SEM, the pore volume by mercury penetration, the content of zeolite produced in the pores of activated carbon, the specific surface area by BET method, the adsorption capacity of moisture, the adsorption capacity of ammonia and the adsorption capacity of iodine were measured.

The complex molecular sieve compounds produced by this invention have zeolite of A, X, or Y type finely distributed into the pores of activated carbon. Therefore the compounds have both hydrophilic and hydrophobic adsorption power having properties of activated carbon and zeolite. Because these unique properties, these compounds use as treatment agent of water purification, deodorizing agent, antibacterial and disinfectant agent, adsorbent of organic matter, adsorbent of moisture, reagent of harmful gas of cigarette, separable agent of air etc. and wide uses.

The present invention is represented in detail by the examples below, which aren't intended to be exemplary only.

EXAMPLE 1

56.5 g of sodium hydroxide(NaOH content: more than 99%, Tedia) was added to 90 g of water and dissolved, 49.1 g of aluminum hydroxide(Al(OH)$_3$, Osaka Co.) was added to it and stirred for 30 minutes at 105° C. until completely dissolved, and then diluted by adding 175.2 g of water.

Separately 195.3 g of water was added to water glass No. 3(Taepung chemical co. Na$_2$O; 8.92 wt %, SiO$_2$; 27.53 wt %, H$_2$O; 63.55 wt %) and dissolved and 6.8 g of sodium hydroxide was added gradually for 30 minutes at 50° C.

The sodium aluminate solution and sodium silicate component thus produced were cooled to 10° C. and mixed for 10 minutes in stirring machine. After gelation was acheived, 380 g of activated carbon (Samchuly co. 8~16 mesh granulated form) was added and gel composition was allowed to penetrate and deposit into the pores of activated carbon under reduced pressure for 30 minutes. In this time, mole ratio of SiO$_2$/Al$_2$O$_3$ of gel composition thus produced was 2.0.

The reaction mixture was allowed to age at 40° C. for 48 hours and crystallized at 100° C. for 6 hours. Side product of slurry phase was removed and solid material thus obtained was washed by 1345 g of water, and dried for 6 hours at 110° C. and the granulated complex molecular sieve component with zeolite of 4A type deposited into the pores of activated carbon was acquired.

Sample acquired in this way was measured by X-ray diffraction (XRD). The pore volume, the content of zeolite produced in the pores of activated carbon, the specific surface area, the adsorption capacity of moisture, the adsorption capacity of ammonia and the adsorption capacity of iodine were measured. The results were represented at table 1.

Zeolite distribution in the pores of activated carbon was observed by SEM, as representing drawing 1. It was confirmed that fine crystalline of zeolite was firmly produced in the pore of activated carbon.

EXAMPLE 2

After 8.2 g of sodium hydroxide(NaOH content: more than 99%, Tedia) was added to 60 g of water and dissolved, 53.2 g of sodium aluminate(Kanto Co., $Na_2O$; 31.0 wt %, $Al_2O_3$; 37.0 wt %, $H_2O$; 32.0 wt %) was added to it and stirred for 30 minutes at 80° C., and then diluted by adding 195.3 g of water.

Separately 240.5 g of water was added to 70.3 g of colloidal silica(Dupont co., $SiO_2$; 40.5 wt %, $H_2O$; 59.5 wt %) and diluted and 18.3 g of sodium hydroxide was added gradually for 30 minutes at 50° C.

The sodium aluminate solution and sodium silicate component thus produced were cooled to 10° C. and mixed for 10 minutes in stirring machine. After gelation was achieved, 450 g of activated carbon(Samchuly co, 8~16 mesh granulated form) was added to it, gel component was allowed to penetrate and deposit into the pores of activated carbon under the reduced pressure for 30 minutes. In this time, mole ratio of $SiO_2/Al_2O_3$ of gel composition thus produced was 2.5.

The reaction mixture was allowed to age at 40° C. for 72 hours and crystallized at 100° C. for 6 hours. The side product of slurry phase was removed and solid material thus obtained was washed by 1566 g of water, and dried for 6 hours at 100° C., the granulated giving complex molecular sieve compound with almost zeolite of X type deposited into the pores of activated carbon was acquired.

Sample acquired in this way was measured by X-ray diffraction (XRD). The pore volume, the content of zeolite produced in the pores of activated carbon, the specific surface area, the adsorption capacity of moisture, the adsorption capacity of ammonia and the adsorption capacity of iodine were measured. The results were represented as following table 1.

EXAMPLE 3

After 75.3 g of sodium hydroxide(NaOH content: more than 99%, Tedia) was added to 120 g of water and dissolved, 48.9 g of aluminum hydroxide(Al(OH)$_3$, Osaka Co.) was added to it and stirred for 30 minutes at 150° C. until completely dissolved, and then diluted by adding 68.5 g of water.

Separately 120.3 g of sodium hydroxide was added to 530 g of water and diluted and 276.1 g of fumed silica(Degusaa, $SiO_2$; more than 99.5 wt %) was added gradually for 60 minutes at 60° C.

The sodium aluminate solution and sodium silicate component thus produced were cooled to 10° C. and mixed for 10 minutes in stirring machine. After gelation was achieved, 450 g of activated carbon(Samchuly co, 8~16 mesh granulated form) was added and gel composition was allowed to penetrate and deposit into the pores of activated carbon under reduced pressure for 30 minutes. In this time, mole ratio of $SiO_2/Al_2O_3$ of gel component thus produced was 15.0.

The reaction mixture was allowed to age at 40° C. for 48 hours and crystallized at 100° C. for 6 hours. The side product of slurry phase is removed and solid material thus obtained was washed by 1536 g of water, dried for 6 hours at 110° C. granulated giving complex molecular sieve component which zeolite of Y type deposited in the pores of activated carbon.

Sample acquired in this way was measured by X-ray diffraction (XRD). The pore volume, the content of zeolite produced in the pores of activated carbon, the specific surface area, the adsorption capacity of moisture, the adsorption capacity of ammonia and the adsorption capacity of iodine were measured. The results were represented as following table 1.

COMPARATIVE EXAMPLE 4.0 kg of zeolite powder of 4A type(water content: 4.9 wt %), 16.7 kg of activated carbon powder(water content: 3.0 wt %) and 5.0 kg of bentonite powder(water content: 2.0 wt %)were added to plowshare mixer of 130 L capacity (Germany, Lödige) and mixed for 6 minutes.

And then 9.5 kg of CMC aqueous solution was injected into for 3 minutes by nozzle, continuously granulated for 10 minutes and the granulated composition having 1.5 mm of average diameter was manufactured.

Manufactured granulated composition was dried at 120° C. for 3 hours with convection-type dryer and calcined at 650° C. for 2 hrs under nitrogen condition. And then, the granulated giving complex molecular sieve composition was acquired.

By this, sample was measured by X-ray diffraction(XRD). The content of zeolite, the specific surface area, the pore volume, the moisture adsorption capacity, the ammonia adsorption capacity and the adsorption capacity of iodine were measured The results were represented as following.

TABLE 1

|  | EXAMPLE | | | COMPARA-TIVE |
| --- | --- | --- | --- | --- |
|  | 1 | 2 | 3 | EXAMPLE |
| Type of Zeolite of sample (XRD) | most of type of 4A | most of type of X | most of type of Y | most of of type of 4A |
| Content of zeolite of sample (wt %) | 15.2 | 13.8 | 12.1 | 15.2 |
| Specific surface area (m$^2$/g) | 1,267 | 1,320 | 1,353 | 932 |
| Pore volume (ml/g) | 0.49 | 0.51 | 0.52 | 0.43 |
| Adsorption capacity of moisture (mg/g); 25° C., 1 torr | 51.3 | 42.5 | 46.3 | 36.3 |
| Adsorption capacity of ammonia (mg/g); 25° C., 10 torr | 31.6 | 30.5 | 26.9 | 23.2 |
| Adsorption capacity of iodine (mg/g); 25° C. | 936 | 963 | 982 | 665 |

What is claimed is:

1. A manufacturing method of granulated complex molecular sieve compound having multi-functional adsorption capacity, which is characterized in comprising:
   (a) manufacturing sodium aluminate aqueous solution by reacting sodium hydroxide and a substance containing alumina;
   (b) manufacturing sodium silicate composition by reacting sodium hydroxide and a substance containing silica;

(c) gelling by said sodium aluminate aqueous solution and sodium silicate composition by homogeneously mixing to form a gel composition mole ratio of $SiO_2/Al_2O_3$ is 2.0~40.0;

(d) depositing said gel composition into the pores of activated carbon; and (e) aging and crystallizing the deposited gel composition.

2. The manufacturing method according to claim 1, wherein the substance containing alumina in (a) step is selected from the group consisting of sodium aluminate ($NaAlO_2$), aluminum nitrate($Al(NO_3)_3 \cdot 9H_2O$), aluminum sulfate($Al_2(SO_4)_3 \cdot 18H_2O$), aluminum chloride ($AlCl_3 \cdot 6H_2O$), aluminum hydroxide($Al(OH)_3$), aluminum alkoxide and alumina gel.

3. The manufacturing method according to claim 1, wherein the substance containing silica in (b) step is selected from the group consisting of colloidal silica, fumed silica, water glass and silica gel.

4. The manufacturing method according to claim 1, wherein said mole ratio of $SiO_2/Al_2O_3$ in (c) step is 2~15.

5. The manufacturing method according to claim 1, wherein said activated carbon in (d) step is 20~70 wt % of said gel composition.

6. The complex molecular sieve compound manufactured by method according to anyone of claims 1 to 5, in which zeolite of A, X or Y type is firmly linked in the pores of activated carbon.

* * * * *

UNITED STATES PATENT AND TRADEMARK OFFICE
CERTIFICATE OF CORRECTION

PATENT NO.     6,117,810

DATED:         September 12, 2000

INVENTORS:     Jung Min LEE et al

It is hereby certified that errors appear in the above-identified patent and that said Letters Patent is hereby corrected as shown below:

Claim 2, Col. 7, line 11, change "$(Al(NO_3)_3.9H_2O)$" to -- $(Al(NO_3)_3 \bullet 9H_2O)$ --

Claim 2, Col. 7, line 12, change "$(Al_2(SO_4)_3.18H_2O)$" to -- $(Al_2(SO_4)_3 \bullet 18H_2O)$ --

Claim 2, Col. 7, line 13, change "$(AlCl_3 .6H_2O)$" to -- $(AlCl_3 \bullet 6H_2O)$ --

Signed and Sealed this

Twenty-fourth Day of April, 2001

Attest:

NICHOLAS P. GODICI

Attesting Officer        Acting Director of the United States Patent and Trademark Office